June 5, 1951      R. W. DAVIS      2,555,578
SPECTACLES HAVING ORNAMENTAL DETACHABLE FRAMES
Filed July 7, 1948
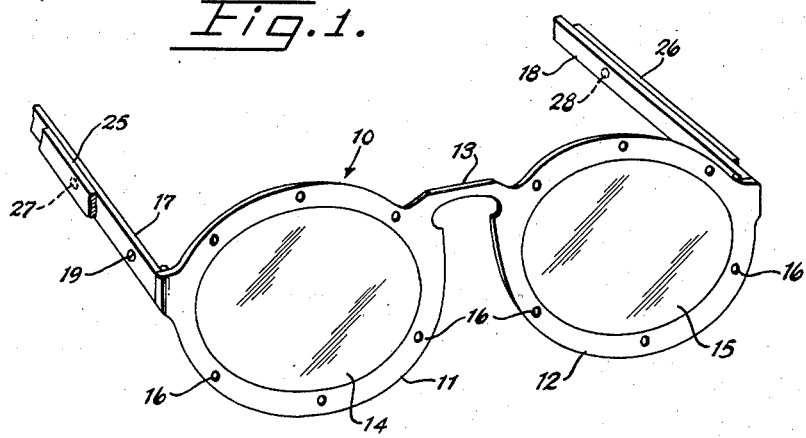
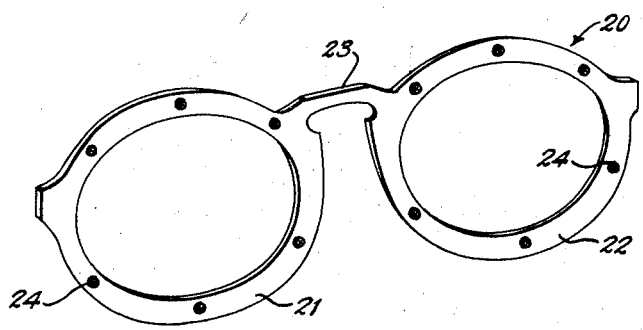
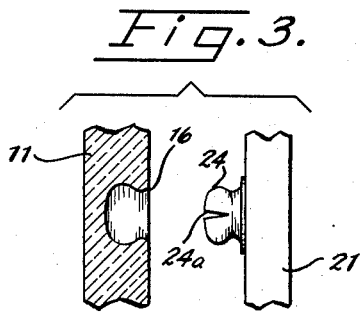
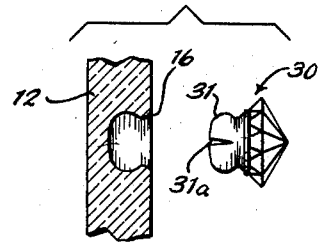
Inventor
RANE W. DAVIS.
By Thomas F. Healy
Attorney Patented June 5, 1951

2,555,578

UNITED STATES PATENT OFFICE 2,555,578

SPECTACLES HAVING ORNAMENTAL
DETACHABLE FRAMES

Rane W. Davis, Washington, D. C.

Application July 7, 1948, Serial No. 37,351

2 Claims. (Cl. 88—41)

The present invention relates to a spectacle frame, and more particularly to a basic plastic spectacle frame with auxiliary eye portions and auxiliary temples removably secured to the basic frame.

The primary object of the present invention is to provide a spectacle frame for ladies' and children's wear constructed and designed to have interchangeable eye portions and temples of different colors to blend with the ensemble.

A further object is to provide a spectacle frame for ladies or children constructed and designed to have interchangeable jewels or other forms of decoration.

The invention broadly embraces the concept of providing a spectacle frame provided with means to have changeable color schemes, shapes or jewels for the spectacles.

Other and further objects and advantages of the present invention will be apparent from the following description thereof and from the claims appended thereto.

In the drawing wherein like numerals refer to like or corresponding parts throughout the several views;

Figure 1 is a fragmentary perspective view showing the basic spectacle frame, with auxiliary temples being secured to the temples thereof, and generally embodying the features of the present invention;

Figure 2 is a perspective view showing the snaps on the back of the cover frame;

Figure 3 is a disassembled view showing a detail of one of the snap-locks to removably secure the cover frame to the basic frame; and Figure 4 is a disassembled detail showing snap-fastening means to removably secure jewels or the like to the basic frame.

Referring now to the drawing wherein for purposes of illustration there is shown the preferred embodiment of the present invention, the numeral 10 generally represents an ophthalmic mounting, and comprising the eye portions 11 and 12, connected by the bridge 13. Eye portions 11 and 12 are provided with lenses 14 and 15, secured therein in conventional manner. The spectacle frame 10 may be made of any desired material, and the eye portions 11 and 12 may be of any desired shape. Except as hereinafter more fully explained, the spectacle frame 10 is conventional.

Each eye portion 11 and 12 is provided on the front marginal edge portions thereof with a plurality of spaced-apart recesses, indicated by the numeral 16. The spectacle frame is also provided with the usual temple members 17 and 18, which are pivotally secured to the temporal sides of the eye portions 11 and 12 of the basic frame. Each temple 17 and 18 is exteriorly provided with a plurality of spaced-apart recesses, similar to recesses 16 in eye portions 11 and 12, with said recesses in the temple members 17 and 18 being designated by the numeral 19.

As best shown in Figure 2 of the drawing, I have provided a cover frame, generally indicated by the numeral 20, with said cover frame 20 including eye portions 21 and 22 connected by a bridge 23. The rear marginal edges of eye portions 21 and 22 are provided with spaced-apart studs 24, which are split crosswise, as at 24a, to give them some resiliency and make it possible for the studs 24 to be snap-locked into recesses 16 in the eye portions 11 and 12 of the basic frame 10. The cover frame 20 can thus be easily removed from the basic frame 10 and replaced with a second cover frame when it is desired to change the color scheme of the spectacles to suit the color of the ensemble being worn by the lady spectacle wearer.

The temple members 17 and 18 of the basic frame 10 are also provided with auxiliary temple members 25 and 26 each of which is provided with a plurality of spaced-apart studs, shown in dotted lines as 27 and 28, said studs being similar in construction and structure as studs 24 positioned on the rear of the cover frame 20, as shown in Figure 2 of the drawing.

Thus it can be seen that I have provided a means for simply and effectively changing the color scheme or style of a lady's or child's spectacles, by providing means to selectively cover the basic frame, including the temples with auxiliary members of a different color or style from the basic frame, the color or style depending upon the effect desired. As the cover frame 20 and the auxiliary temples 25 and 26 may be of any one of a plurality of colors, it is thus possible to obtain any one of a plurality of different color effects, depending upon the color scheme of the ensemble being worn. The style of the spectacles can be selectively changed by varying the pattern design or shape of the cover frame or auxiliary temples.

Referring to Figure 4 of the drawing, I have shown a detail, wherein a jewel or gem, or other decorative elements 30 may be removably secured in a recess 16 of the basic frame 10. In other words, a plurality of jewels or gems, such as 30, are disposed in the recesses in the basic frame 10, including temples 17 and 18. Each jewel 30 is provided with a stud 31, which is split crosswise as at 31a to give it a certain resiliency so that it can snap-lock into a recess 16 of the basic frame 10. The jewels 30 may be easily removed from the basic frame 10 when desired.

Various modifications of the present invention will be apparent to those skilled in the art without departing from the spirit thereof, and it is therefore desired to be limited only by the scope of the appended claims.

What I claim is:

1. An ophthalmic mounting comprising a basic spectacle frame including two eye portions connected by a bridge, said basic frame being of one color, the front face of said eye portions being provided with spaced apart recesses, a cover frame of a color contrasting to that of said basic frame and including two eye portions connected by a bridge of substantially the same size and contour as said basic spectacle frame, and spaced apart studs corresponding in number and location to said recesses and secured to the rear face of said eye portions of the cover frame, said studs being adapted to be removably received by said recesses for removably positioning said cover frame over the front face of the eye portions and bridge of said basic spectacle frame for completely masking the same.

2. An ophthalmic mounting comprising a basic spectacle frame having two eye portions connected by a bridge and a temple bar connected to each eye portion, said eye portions being provided with spaced apart recesses on the front face thereof and said temple bars being provided with spaced apart recesses on the outer faces thereof, a set of cover frames of various colors, each cover frame comprising two eye portions connected by a bridge, and a pair of auxiliary temple members, each of said cover frames having a plurality of spaced apart studs secured to the rear face thereof and within the confines of the cover frame and adapted to be removably received by the recesses in said basic spectacle frame, each of said cover frames having its various parts of a size and contour commensurate with the corresponding parts of the basic spectacle frame, whereby said cover frame will completely mask the outer faces of said basic spectacle frame when disposed thereon, said cover frame being of a size sufficient to conceal said recesses and studs, whereby the studs and recesses will be hidden from the front and rear when the cover frame is in mounted position.

RANE W. DAVIS.

REFERENCES CITED

The following references are of record in the file of this patent:

UNITED STATES PATENTS

| Number | Name | Date |
| --- | --- | --- |
| 1,555,388 | Schumacher | Sept. 29, 1945 |
| 2,482,195 | Martin | Sept. 20, 1949 |

FOREIGN PATENTS

| Number | Country | Date |
| --- | --- | --- |
| 474,822 | France | Jan. 4, 1915 |
| 466,034 | Great Britain | May 20, 1947 |